United States Patent Office 2,917,946
Patented Dec. 22, 1959

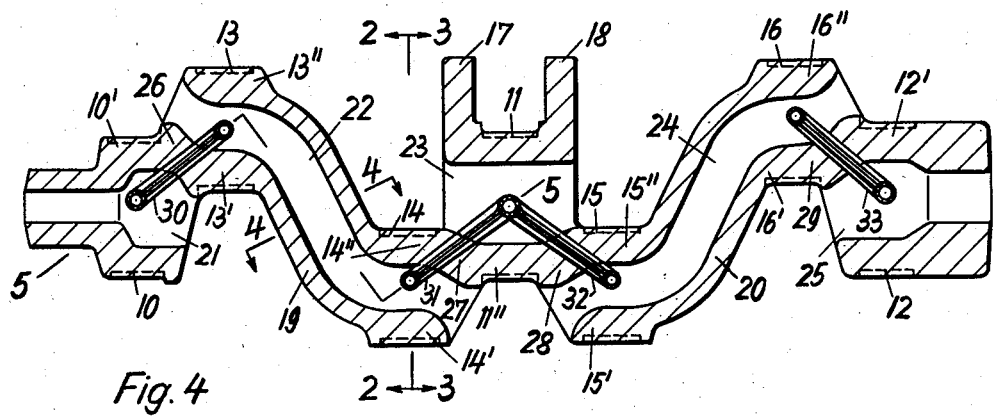
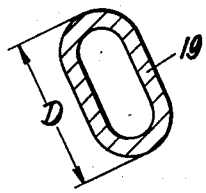
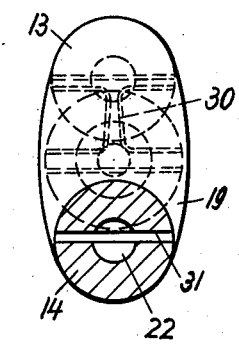
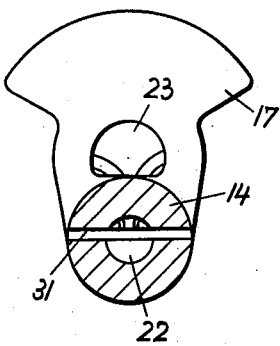
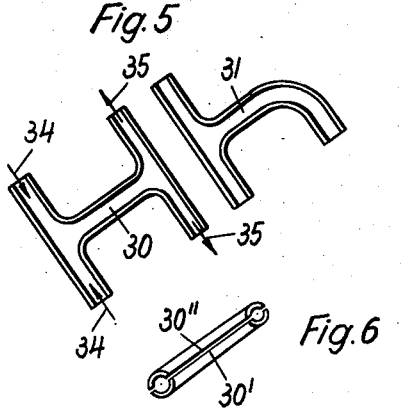
Dec. 22, 1959  M. FRITZ  2,917,946
CRANKSHAFT
Filed Jan. 24, 1955
INVENTOR
MARTIN FRITZ
BY Dicke and Craig.
ATTORNEYS

2,917,946
CRANKSHAFT

Martin Fritz, Oberurbach, near Schorndorf, Germany, assignor to Daimler-Benz Aktiengesellschaft, Stuttgart-Unterturkheim, Germany Application January 24, 1955, Serial No. 483,707

Claims priority, application Germany January 22, 1954

8 Claims. (Cl. 74—596)

The present invention relates to a crankshaft, and more particularly a crankshaft made of cast iron.

A principal object of the invention is to design and provide a crankshaft of very low weight which, however, permits the transmission of large forces as well as the best possible distribution of stresses within the material thereof.

A primary feature of the invention for accomplishing the above object consists in providing a hollow shaft of uniform wall strength, the transition points between the crank webs, as well as the bearing pins, including the connecting rod bearing or crank pins of which being smoothly rounded off.

Another object and feature of the invention consists in considerably avoiding bends of the most essential wall sections by providing and distributing the cavities within the crankshaft so that continuous wall sections will be formed which extend transversely across the crank arms from one side of one of two adjacent bearing pins to the opposite side of the other adjacent bearing pin. For this purpose, the crank arms, and especially the portions between two crank pins which are displaced 180° relative to each other, are made of a hollow, oval cross-section, the larger diameter of which extends in a transverse direction of the shaft.

Another feature of the invention consists in the use of so-called sphero- or spherolytic cast iron as the material for making the crankshaft which has the advantage of being relatively elastic and flexible while having great strength.

A further object of the invention is to provide a simple and advantageous arrangement of the oil conduits by casting them into the crankshaft, thus rendering it unnecessary to provide special oil bores therein.

Further objects, features, and advantages of the present invention will be apparent from the following detailed description thereof and the accompanying drawings, in which Fig. 1 shows a longitudinal section through a crankshaft according to the invention;

Fig. 2 shows a cross section taken along line 2—2 of Fig. 1;

Fig. 3 shows a cross section taken along line 3—3 of Fig. 1;

Fig. 4 shows a cross section taken along line 4—4 of Fig. 1;

Fig. 5 shows a top view upon the cast-in oil conduits in a section taken along line 5—5 of Fig. 1; while Fig. 6 shows a side view of one of the two oil conduits shown in Fig. 5.

Referring to the drawings, the crankshaft as shown particularly in Fig. 1 has three principal or main bearing pins 10, 11, and 12, as well as four connecting rod bearing or crank pins 13, 14, 15, and 16. Counterweights 17 and 18 are cast-on on both sides of the central main bearing pin 11.

The crankshaft in its entirety is shaped so as to obtain the most uniform wall strength possible despite the strong bends at the points of transition, especially between the crank arms 19 and 20, on the one hand, and the crank pins 13, 14 and 15, 16 on the other hand. Altogether, the crankshaft has five cavities 21, 22, 23, 24, and 25, the cavities 22 and 24 extending on each side along an S-shaped curve through the crank arms 19 and 20, respectively, and the adjacent crank pins 13, 14, and 15, 16, respectively. The cavities 21, 23, and 25, however, extend through the main bearing pins 10, 11, and 12, and terminate in the lateral surfaces of the crank arms 26, 27, 28, and 29 which connect the main bearing pins with the adjacent crank pins.

Such provision and extent of the cavities furnishes a very suitable shape of the walls forming the crankshaft, one continuous wall thus extending, for example, from the upper side 10' of the main bearing pin 10 across the crank arm 26 to the lower side 13' of the pin 13 and thence along the lower side of the crank arm 19 to the lower side 14' of the crank pin 14. A corresponding wall also extends from the upper side 12' of the main bearing pin 12 across the crank arm 29, the lower side 16' of the crank pin 16, the lower side of the crank arm 20 to the lower side 15' of the crank pin 15.

A continuous wall also extends above the cavities 22 and 24 and below the cavity 23 from the upper side 13" of the crank pin 13 through the crank web 19, the upper side 14" of the crank pin 14, across the crank arm 27 to the lower side 11" of the main bearing pin 11, and thence symmetrically across the crank arm 28 to the upper side 15" of the crank pin 15, and thence along the upper side of the crank arm 24 to the upper side 16" of the crank pin 16.

A crankshaft thus designed and constructed is especially suitable for adapting itself to the stresses arising in the casting thereof.

In order to permit the crankshaft to take up considerable torsional moments, the crank arms 19 and 20 thereof are made of substantially oval cross section, as shown particularly in Fig. 4, so that the maximum diameter D extends in transverse direction of the crankshaft.

For lubricating the connecting rod bearings, conduits 30, 31, 32, and 33 are cast into the material, such conduits, as shown in Figs. 5 and 6, each being of bifurcated shape toward their ends so as to terminate at the outer surface of the main bearing pins or the crank pins, respectively. The conduits each consist of two halves of semicircular cross section, such as 30' and 30", which are superimposed upon each other before being cast-in so as to obtain closed conduits. The oil may thus flow from the main bearings inwardly, for example, in the direction shown by the arrow 34 in Fig. 5, and may pass over into the crank pins at 35.

While I have described my invention with reference to the preferred embodiments thereof I wish to have it understood that it is in no way limited to the details of such embodiments or to the specific examples described, but is capable of numerous modifications within the scope of the appended claims.

What I claim is:

1. A crankshaft having a main central and two main end bearing pins and four crank pins, two of said crank pins on each side of center and disposed adjacent to each other immediate said central and end bearing pins respectively and connected by a crank arm with each other and by other crank arms with the adjacent main bearing pin, said two crank pins on each side together with the crank arm connecting the same forming a substantially S-shaped section of said crankshaft and being cast hollow to form a continuous and substantially S-shaped cavity of substantially uniform cross section extending only through said section, all three main bearing pins also having separate cavities cast therein extending along a substantially straight line through said main bearing pins, said separate cavities also extending through the crank arm adjacent to said main bearing pins.

2. A crankshaft cast in one piece having a plurality of main bearing pins, a plurality of crank pins, and crank arms connecting said bearing pins and crank pins, said crankshaft having a plurality of individual cavities formed by casting and extending in a longitudinal direction therethrough, at least one of said cast cavities extending continuously only through two adjacent crank pins and the crank arm connecting the same.

3. A crankshaft as defined in claim 2, wherein the crank arm connecting the two crank pins, together with said two crank pins forms a substantially S-shaped section having a continuous S-shaped cavity of substantial cross section and of generally constant cross-section size, the wall of said section at each end extending at the inside of said crank pin transversely across the crank arm adjacent to said crank pin and connecting the same with one of said respective main bearing pins, each said wall merging into the wall of said respective main bearing pin.

4. A cast crankshaft having a plurality of main end bearing pins, a plurality of crank pins, and crank arms connecting one of each of said main bearing pins with one of said crank pins, other crank arms connecting two of each of said crank pins with each other, and having individual cast cavities, said cavities being round elongated cross section each continuously passing through said crank arm connecting two crank pins, and through said last-mentioned crank pins; and separate cavities passing through the main bearing pins, each of said last-mentioned cavities also passing through the crank arms connecting the crank pins with the main bearing pin.

5. A crankshaft as defined in claim 4, wherein a wall extends between each said separate cavity in a main bearing pin and the cavity in an adjacent crank pin transversely through the crank arm connecting said two pins, and further comprising individual oil conduits in the crank arms directly connecting the main bearing pins with the crank pins, said conduits extending through said wall between said separate cavity in the main bearing pin and the cavity in the crank pin.

6. A crankshaft as defined in claim 5, wherein said conduit comprises a center conduit portion extending through said wall and conduit end portions each connected to one end of said center portion, at least one of said end portions passing through a respective pin and terminating at diametrically opposite sides of the bearing surface thereof.

7. A crankshaft as defined in claim 1 wherein the wall thickness of said S-shaped section is increased in the region of transition between each of said two crank pins and said crank arm connecting the two crank pins.

8. A crankshaft as defined in claim 1, wherein the cross-sectional area of the walls of said S-shaped sections is preferably such that the stiffness thereof is substantially equal to the stiffness of the arms connecting one of said crank pins with one of said main bearing pins adjacent thereto.

References Cited in the file of this patent

UNITED STATES PATENTS

| | | |
|---|---|---|
| 1,588,850 | Murray | June 15, 1926 |
| 1,874,444 | Carvelli | Aug. 30, 1932 |
| 2,196,422 | Meyer | Apr. 9, 1940 |

FOREIGN PATENTS

| | | |
|---|---|---|
| 421,288 | Great Britain | Dec. 18, 1934 |
| 481,269 | Italy | May 27, 1953 |
| 485,336 | Germany | Oct. 29, 1929 |
| 1,118,956 | France | Mar. 26, 1956 |

OTHER REFERENCES

"Cromol Crankshafts," Automobile Engineer (British magazine), December 1945.

"New German Ford," p. 44, Automotive Industries, vol. 112, No. 5, Mar. 1, 1955.